(12) United States Patent
Kim et al.

(10) Patent No.: US 8,955,124 B2
(45) Date of Patent: Feb. 10, 2015

(54) APPARATUS, SYSTEM AND METHOD FOR DETECTING MALICIOUS CODE

(75) Inventors: Yo Sik Kim, Daejeon (KR); Sang Kyun Noh, Gwangju (KR); Yoon Jung Chung, Seongnam-si (KR); Dong Soo Kim, Pohang-si (KR); Won Ho Kim, Daejeon (KR); Yu Jung Han, Suwon-si (KR); Young Tae Yun, Daejeon (KR); Ki Wook Sohn, Daejeon (KR); Cheol Won Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 476 days.

(21) Appl. No.: 12/985,252

(22) Filed: Jan. 5, 2011

(65) Prior Publication Data

US 2011/0271343 A1 Nov. 3, 2011

(30) Foreign Application Priority Data

Apr. 28, 2010 (KR) ........................ 10-2010-0039335

(51) Int. Cl.
*G06F 21/00* (2013.01)
*G06F 21/56* (2013.01)

(52) U.S. Cl.
CPC .................................. *G06F 21/566* (2013.01)
USPC .......................................................... 726/23

(58) Field of Classification Search
USPC .......................................................... 726/23
See application file for complete search history.

(56) References Cited

U.S. PATENT DOCUMENTS

| 5,842,002 | A | * | 11/1998 | Schnurer et al. | ................. | 703/21 |
| 7,234,164 | B2 | | 6/2007 | Carmona | | |
| 7,376,970 | B2 | * | 5/2008 | Marinescu | ....................... | 726/22 |
| 7,493,654 | B2 | * | 2/2009 | Bantz et al. | ....................... | 726/4 |
| 7,559,086 | B2 | * | 7/2009 | Sobko et al. | ..................... | 726/24 |
| 7,716,530 | B2 | * | 5/2010 | Verbowski et al. | ............. | 714/37 |
| 7,779,472 | B1 | * | 8/2010 | Lou | ................................. | 726/24 |
| 7,797,702 | B1 | * | 9/2010 | Ferrie | .......................... | 718/101 |

(Continued)

FOREIGN PATENT DOCUMENTS

| JP | 03-233629 A | 10/1991 |
| JP | 2002-342106 A | 11/2002 |

(Continued)

OTHER PUBLICATIONS

Behavior-based Proactive Detection of Unknown Malicious Codes; Jianguo Ding et al.; 2009 Fourth International Conference on Internet Monitoring and Protection; IEEE; 2009.*

(Continued)

*Primary Examiner* — Bradley Holder
*Assistant Examiner* — James Turchen
(74) *Attorney, Agent, or Firm* — LRK Patent Law Firm

(57) ABSTRACT

Provided are an apparatus, system and method for detecting malicious code inserted into a normal process in disguise. The apparatus includes a malicious code detection module for extracting information on a thread generated by a process running on a computer system to identify code related to the thread, preliminarily determining whether or not the identified code is malicious and extracting the code preliminarily determined to be malicious; and a forcible malicious code termination module for finally determining the code as malicious code based on an analysis result of behavior of the extracted code executed in a virtual environment and forcibly terminating execution of the code.

13 Claims, 3 Drawing Sheets

(56) References Cited

U.S. PATENT DOCUMENTS

| | | | |
|---|---|---|---|
| 7,797,752 B1 * | 9/2010 | Vaidya et al. | 726/27 |
| 8,042,186 B1 * | 10/2011 | Polyakov et al. | 726/24 |
| 8,181,251 B2 * | 5/2012 | Kennedy | 726/23 |
| RE43,624 E * | 8/2012 | Kedma et al. | 726/3 |
| 8,239,836 B1 * | 8/2012 | Franz et al. | 717/127 |
| 8,434,151 B1 * | 4/2013 | Franklin | 726/24 |
| 2002/0087824 A1 * | 7/2002 | Hum et al. | 711/202 |
| 2002/0162015 A1 | 10/2002 | Tang | |
| 2003/0159070 A1 * | 8/2003 | Mayer et al. | 713/201 |
| 2005/0246453 A1 * | 11/2005 | Erlingsson et al. | 710/1 |
| 2008/0209557 A1 * | 8/2008 | Herley et al. | 726/23 |
| 2008/0301051 A1 * | 12/2008 | Stahlberg | 705/44 |
| 2009/0007100 A1 * | 1/2009 | Field et al. | 718/1 |
| 2009/0044274 A1 * | 2/2009 | Budko et al. | 726/24 |
| 2009/0133126 A1 | 5/2009 | Jang et al. | |
| 2009/0172781 A1 * | 7/2009 | Masuoka et al. | 726/3 |
| 2009/0323799 A1 * | 12/2009 | McDade, Sr. | 375/240.01 |
| 2010/0083376 A1 | 4/2010 | Pereira et al. | |
| 2011/0113427 A1 * | 5/2011 | Dotan | 718/1 |

FOREIGN PATENT DOCUMENTS

| | | | |
|---|---|---|---|
| JP | 2006-065947 A | 3/2006 | |
| JP | 2006-522960 A | 10/2006 | |
| JP | 2009-129451 A | 6/2009 | |
| JP | 2010-049627 A | 3/2010 | |
| JP | 2010-079906 A | 4/2010 | |
| KR | 10-2007-0049511 A | 5/2007 | |
| KR | 10-2009-0130990 A | 12/2009 | |
| WO | 2004/090733 A1 | 10/2004 | |

OTHER PUBLICATIONS

Automatic Detection of Unsafe Component Loadings; Taeho Kwon et al.; ISSTA'10, Jul. 12-16, 2010, Trento, Italy.; ACM; 2010.*

TTAnalyze: A Tool for Analyzing Malware; Ulrich Bayer et al.; 2006.*

Woosapyeong, "Introduction to x86 Program Analysis by Debugger," Soowa System Corp., Jul. 15, 2007 First Edition, pp. 55-56.

Mario Hewardt et al., "Secret of Windows Debug," ASCII Media Works Inc., Apr. 30, 2009 First Edition, pp. 157-159.

Sachihiro Ichikawa et al., "Construction of Memory-Resident Malicious Code Detection System for Virus Analysis," Technical Report of IEICE, Nov. 2, 2004, vol. 104, No. 422, pp. 59-60.

Takahiro Matsuki et al., "Proposal of Anti-Malware Technique Turning Security Disabling Attack to Advantage," Journal of Information Processing Society of Japan, Sep. 15, 2009, vol. 50, No. 9, pp. 2130-2133.

* cited by examiner

APPARATUS, SYSTEM AND METHOD FOR DETECTING MALICIOUS CODE

CROSS-REFERENCE TO RELATED APPLICATION

This application claims priority to and the benefit of Korean Patent Application No. 10-2010-0039335, filed Apr. 28, 2010, the disclosure of which is incorporated herein by reference in its entirety.

BACKGROUND

1. Field of the Invention

The present invention relates to an apparatus, system and method for detecting malicious code, and more particularly, to a system and method for extracting information on threads of processes running on a computer system, determining whether the threads have been generated by malicious code, and analyzing a malicious code behavior in a virtual environment to detect malicious code inserted into a normal process in disguise.

2. Discussion of Related Art

As Internet services have diversified lately, use of the Internet is increasing. Thus, malicious code, such as computer viruses and Internet worms, is widespread over the Internet and causes extensive damage to Internet users. In particular, damage is continuously caused by malicious code, such as a hot that resulted in "77 chaos" in 2009. Such malicious code performs a malicious behavior on a user's personal computer (PC) under a command and control (C&C) by inserting a thread into a normal process to serve as a server. To hide its own presence, such malicious code disguises itself as a normal process by dynamic link library (DLL) injection or code injection.

A conventional malicious code detection method generates a signature using a binary hash value or a continuous byte sequence in a specific area of code and compare it with those registered in a malicious code binary pattern database to determine whether or not it is malicious. If it is malicious, it is forcibly terminated and deleted. According to the conventional method depending on binary pattern comparison, previously-known malicious code is very likely to be detected. However, it is impossible to detect unknown malicious code.

Also, hooking of a specific application programming interface (API) or hooking on a kernel layer can be used to detect malicious code. However, in the former scheme, only the specific API is hooked so that a user must monitor a code behavior and determine whether or not it is malicious. In the latter scheme, system malfunction may result in a critical failure.

SUMMARY OF THE INVENTION

The present invention is directed to providing a system and method for detecting malicious code disguised as a normal process by first determining whether a thread generated by a process running on a computer system is generated by malicious code and additionally analyzing a malicious code behavior in a virtual environment when the thread is suspicious to be malicious.

One aspect of the present invention provides an apparatus for detecting malicious code including: a malicious code detection module for extracting information on a thread generated by a process running on a computer system to identify code related to the thread, preliminarily determining whether or not the identified code is malicious and extracting the code preliminarily determined to be malicious; and a forcible malicious code termination module for finally determining the code as malicious code based on an analysis result of behavior of the extracted code executed in a virtual environment and forcibly terminating execution of the code.

Another aspect of the present invention provides a system for detecting malicious code including: a malicious code detection apparatus having a malicious code detection module for extracting information on a thread generated by a process running on a computer system to identify code related to the thread, preliminarily determining whether or not the identified code is malicious and extracting the code preliminarily determined to be malicious; and a forcible malicious code termination module for finally determining the code as malicious code based on an analysis result of behavior of the extracted code executed in a virtual environment and forcibly terminating execution of the code; and a virtual environment malicious code behavior analysis apparatus having a log generation module for executing the code extracted by the malicious code detection module in a virtual environment to generate a behavior log of the code, and a malicious behavior analysis module for analyzing whether the behavior of the code corresponds to one of behavior of disabling an operating system (OS) firewall or vaccine, a virtual environment recognition behavior, and behavior of generating or modifying a file or registry using the log and transferring the analysis result to the forcible malicious code termination module.

Still another aspect of the present invention provides a method of detecting malicious code including: extracting a list of processes running on a computer system and information on a thread subordinate to each process; identifying code related to the thread, and preliminarily determining whether or not the identified code is malicious by examining at least one of a virtual memory of the process, a portable executable (PE) feature of the code, a relationship between the code and a service process, and a thread stack; calculating a degree of malicious threat of the code preliminarily determined to be malicious; extracting code whose calculated degree of malicious threat is a threshold value or more, and requesting a virtual environment malicious code behavior analysis apparatus to analyze the code; finally determining the code as malicious code on the basis of an analysis result received from the virtual environment malicious code behavior analysis apparatus; and forcibly terminating execution of the code finally determined to be malicious code.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Throughout this specification, when an element is referred to as "comprises," "includes," or "has" a component, it does not preclude another component but may further include the other component unless the context clearly indicates otherwise. Also, as used herein, the terms " . . . unit," " . . . device," " . . . module," etc., denote a unit of processing at least one function or operation, and may be implemented as hardware, software, or combination of hardware and software.

Figure 1:
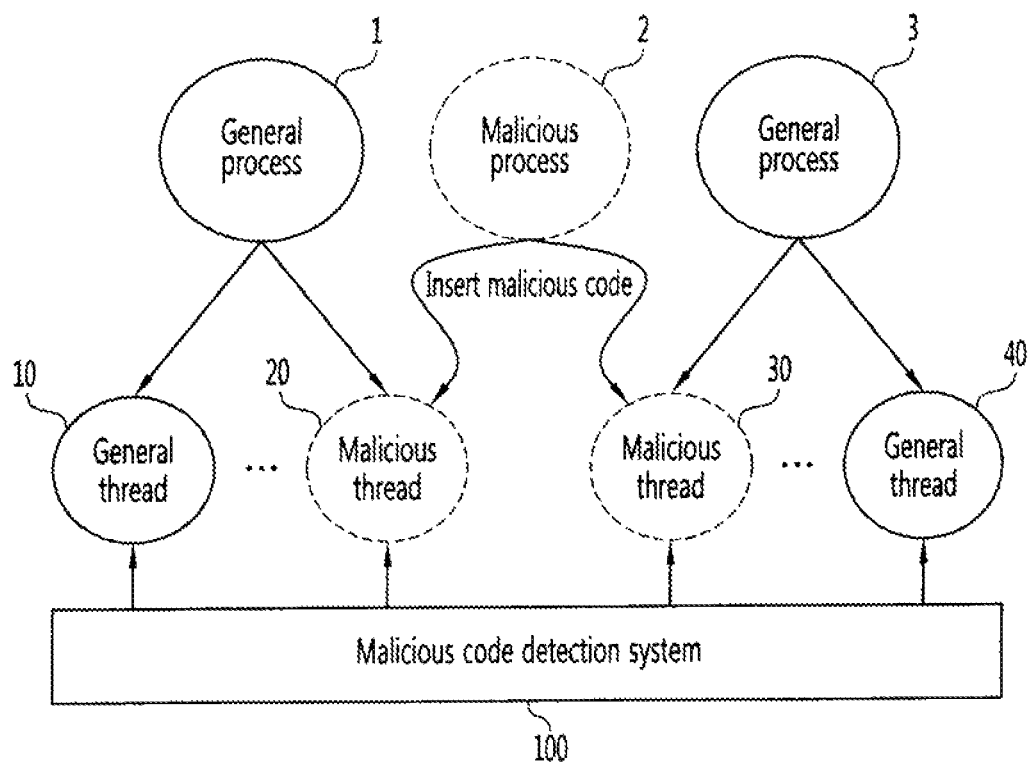
FIG. 1 illustrates the concept of detecting malicious code inserted into a normal process in disguise using a system for detecting malicious code according to an exemplary embodiment of the present invention.

FIG. 1 illustrates the concept of detecting malicious code inserted into a normal process in disguise using a system for detecting malicious code according to an exemplary embodiment of the present invention. As illustrated in the drawing, general processes 1 and 3 generate general threads. On the other hand, a malicious process 2 inserts malicious code performing a malicious action into the normal processes 1 and 3 by dynamic link library (DLL) injection or code injection to hide itself. The inserted malicious code operates as a part of a normal process and thus is difficult to detect. Malicious threads 20 and 30 in charge of malicious behavior are generated by the inserted malicious code.

A system 100 for detecting malicious code according to an exemplary embodiment of the present invention is intended to detect such malicious threads inserted into a normal process.

Figure 2:
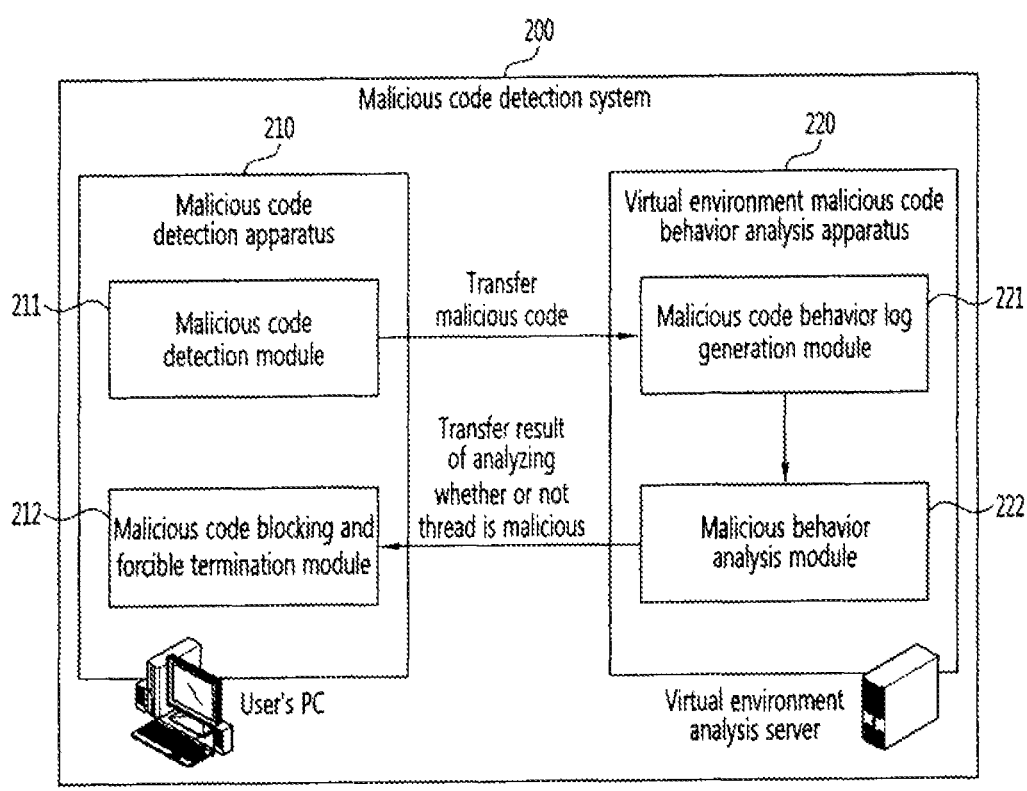
FIG. 2 is a block diagram of a system for detecting malicious code according to an exemplary embodiment of the present invention.

FIG. 2 is a block diagram of a system for detecting malicious code according to an exemplary embodiment of the present invention.

A system 200 for detecting malicious code includes a malicious code detection apparatus 210 which extracts information on a thread generated by a process running on a computer system to identify code related to the thread, and checks whether or not the identified code is malicious to extract code estimated to be malicious, and a virtual environment malicious code action analysis apparatus 220 which executes the code extracted by the malicious code detection apparatus 210 in a virtual environment to analyze a malicious action.

To be specific, the malicious code detection apparatus 210 includes a malicious code detection module 211 and a forcible malicious code termination module 212. In an exemplary embodiment, the malicious code detection apparatus 210 is executed on a user's personal computer (PC). However, the malicious code detection apparatus 210 may also be executed on one of various types of devices such as a laptop computer, a portable computer and a tablet computer, having a network function, and the devices are not limited to those mentioned above.

The malicious code detection module 211 extracts information on a thread generated by a process running on a computer system to identify code related to the thread, preliminarily determines whether or not the identified code is malicious to extract and transfer the code preliminarily determined to be malicious to the malicious code action analysis apparatus 220. The code related to the thread is an execution file running on the computer or a DLL dynamically linked to a process. The malicious code detection module 210 examines at least one of a virtual memory of the process, a portable executable (PE) feature of the identified code, a relationship between the identified code and a service process, and a thread stack related to the thread, thereby preliminarily determining whether or not the identified code is malicious. The process of preliminarily determining whether or not code is malicious according to an exemplary embodiment of the present invention will be described in detail later with reference to FIG. 3.

The forcible malicious code termination module 212 finally determines the code as malicious code on the basis of an analysis result of the malicious code behavior analysis apparatus 220, and forcibly terminates execution of the code. Also, the forcible malicious code termination module 212 may remove the malicious code from the memory of a client.

The virtual environment malicious code action analysis apparatus 220 executes the code transferred from the malicious code detection apparatus 210 in a virtual environment to analyze behavior of the code, and provides the analysis result to the malicious code detection apparatus 210. In the drawing, the virtual environment malicious code action analysis apparatus 220 is executed on a server physically separated from the user's PC, on which the malicious code detection apparatus 210 is executed. However, the virtual environment malicious code action analysis apparatus 220 is not limited to this exemplary embodiment, and may be implemented on the same system as the malicious code detection apparatus 210.

To be specific, the virtual environment malicious code action analysis apparatus 220 includes a malicious code action log generation module 221 and a malicious action analysis module 222.

The malicious code action log generation module 221 executes the code transferred from the malicious code detection apparatus 210 in a virtual environment, thereby generating a log of the code behavior. The malicious code behavior analysis module 222 analyzes the log to analyze whether the behavior of the code is one of behavior of disabling an operating system (OS) firewall or vaccine, behavior of checking a virtual environment, and behavior of generating or modifying a file or registry, and transfers the analysis result to the malicious code blocking and forcible termination module 212 of the malicious code detection apparatus 210.

The process of emulating a virtual environment to analyze the behavior of the code can be implemented using a tool well known in the art, such as a sandbox, and thus a detailed description of the process will be omitted.

Figure 3:
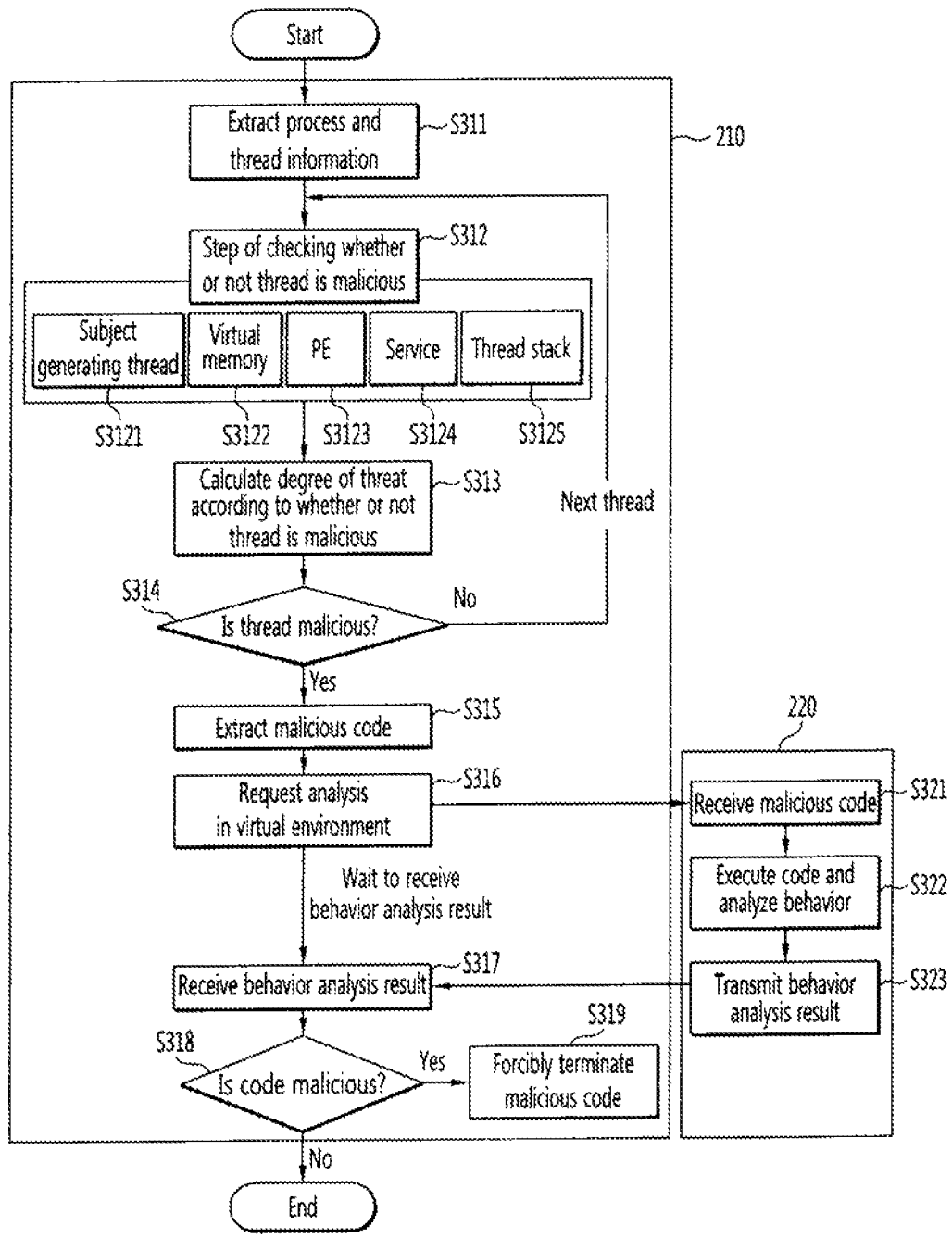
FIG. 3 is a flowchart illustrating a method of detecting malicious code inserted into a normal process in disguise according to an exemplary embodiment of the present invention.

FIG. 3 is a flowchart illustrating a method of detecting malicious code inserted into a normal process in disguise according to an exemplary embodiment of the present invention. FIG. 3 illustrates for convenience that steps 311 to 319 are performed by the malicious code detection apparatus 210, and steps 321 to 323 are performed by the virtual environment malicious code action analysis apparatus 220. However, this is merely an example, and steps 311 to 319 and steps 321 to 323 do not need to be performed by physically separate apparatuses.

In step 311, a list of processes running on a system is extracted, and information on a thread subordinate to each process, for example, the number of threads, and a start address and base address of each thread, is extracted.

In step 312, it is checked whether or not the thread is malicious. To be specific, step 312 includes a step of identifying a subject having generated the thread (S3121), a virtual memory checking step (S3122), a PE analysis step (S3123), a service process checking step (S3124), and a thread stack checking step (S3125).

First, in step 3121, code having generated the thread, that is, an execution file or DLL, is identified. To identify the DLL, DLLs dynamically linked to the process in which the thread is generated are extracted from DLLs linked to the process, and base addresses of the DLLs and sizes in which the DLLs are mapped into a memory are obtained. Among execution files or the dynamically linked DLLs, an execution file or DLL whose base address and mapped range in the memory include a start address of the thread is retrieved, thereby identifying the execution file or DLL having generated the thread.

In the virtual memory checking step (S3122), it is checked whether the string of the file name of the DLL identified in step 3121 is present in the virtual memory of the process in which the thread is generated, and it is determined that the DLL may be malicious code inserted into a normal process in disguise by DLL injection when the string of the file name of the DLL is present.

In the PE analysis step (S3123), the PE format of the identified DLL is examined to determine whether an abnormal element is present. In an example, when an unknown section other than data generated by a general compiler, such as Visual Studio, C++, Builder, Delphi, or Visual Basic, is included in the PE format, it is determined that the DLL may be malicious code inserted into a normal process in disguise. Also, when a checksum is not correct, or a file size in a PE feature is different from a file size shown in an explorer, it is also determined that the DLL may be malicious.

In the service process checking step (S3124), it is checked whether the identified DLL is dynamically linked to a service process running on the Windows OS, and whether a service including the DLL is present in a registry including service information. When there is a service including the DLL, attributes of the service, for example, a service type, a start type, dependency, and information on a belonging group, are examined. When it is examined that the service including the DLL has neither a relationship with nor dependency on another service, or automatic start is set for the service, it is determined that the service may be generated by a malicious DLL.

When the DLL having generated the thread in step 3121 is not detected in the thread stack checking step (S3125), a thread stack is traced to sequentially obtain a list of DLLs used by the thread, and then PE features of the DLLs are examined to check whether an unknown section is in the DLLs. The examination of the PE features is the same as the above-described step (S3123). When it is examined that an unknown section is in a DLL, it is determined that the DLL may be malicious code inserted into a normal process in disguise (S3125).

In step 313, the degree of malicious threat of a DLL estimated to be generated by malicious code is calculated. In an example, when it is determined in the checking process of the above-described steps S3121 to S3125 that the DLL may be malicious, a flag corresponding to the DLL is set. For example, when a string of the corresponding DLL file name is present in the virtual memory checking step (S3122), a DLL injection flag is set. In the PE analysis step (S3123), an unknown section flag is set when an unknown section is present in a PE format, a checksum flag is set when a checksum is not correct, and a file size flag is set when a file size in a PE feature is different from a file size shown in an explorer. A service flag is set in the service process checking step (S3124), and a thread stack flag is set in the thread stack checking step (S3125).

In the step of calculating the degree of malicious threat according to whether or not the thread is malicious (S313), threat scores are set according to three levels of high, medium, and low depending on the flags set in the above-described checking steps. For example, an injected DLL corresponds to the high level (10 points), an unknown section corresponds to the low level (1 point), and a DLL operating as a service corresponds to the medium level (5 points).

When the degree of malicious threat calculated in step 3123 is a threshold value or more, it is determined in step 314 that the thread is malicious. Otherwise, the process proceeds back to step 312 to check whether or not the next thread is malicious.

In step 315, an execution file or DLL file related to the thread determined to be malicious is extracted.

In step 316, the extracted execution file or DLL (referred to as "code" below) is transmitted to the virtual environment malicious code action analysis apparatus 220 to request analysis of the execution file or DLL.

In step 321, the virtual environment malicious code action analysis apparatus 220 receives a code determined to have a high degree of malicious threat by the malicious code detection apparatus 210.

In step 322, the code is executed in a virtual environment to generate a log of file or registry access behavior and network transceiving behavior, and it is determined by log analysis whether the code behavior is one of malicious behavior including behavior of disabling an OS firewall or vaccine, behavior of checking whether the code itself is executed in a virtual environment, and behavior of generating or modifying a file or registry.

In step 323, the analysis result is transmitted to the malicious code detection apparatus 210.

In step 317, the analysis result is received. When the analysis result corresponds to malicious behavior, the execution code is finally determined as malicious code in step 318.

In step 319, execution of the malicious code is forcibly terminated, and the code is deleted.

Using a system and method for detecting malicious code according to an exemplary embodiment of the present invention, it is possible to detect not only already-known malicious code but also unknown malicious code or code modified from already-known malicious code, thus effectively handling malicious code whose probability of malicious behavior is not yet known. For this reason, the system and method can be used to investigate a problem.

Also, after a thread generated by a process running on a computer system is extracted, it is preliminarily determined whether the thread is created by malicious code, and additionally, code behavior in a virtual environment is analyzed when the thread is preliminarily determined to be malicious. Consequently, it is possible to reduce a misdetection ratio of malicious code.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus executed on one or more hardware processors for detecting malicious code, comprising:
a malicious code detection module loaded on said one or more hardware processors for extracting information on a thread generated by a process running on a computer system to identify code related to the thread, preliminarily determining whether or not the identified code is malicious and extracting the code preliminarily determined to be malicious, wherein the malicious code detection module checks whether a string of a file name corresponding to the code related to the thread is present in a virtual memory of the process having generated the thread, and preliminarily determines the code to be malicious when the string is present; and a forcible malicious code termination module loaded on said one or more hardware processors for finally determining the code as malicious code based on an analysis result of behavior of the extracted code executed in a virtual environment and forcibly terminating execution of the code;

wherein when no code related to the thread is identified, the malicious code detection module traces a thread stack to obtain a list of dynamic link libraries (DLLs) being used by the thread, and examines a portable executable (PE) feature of the DLLs to preliminarily determine whether or not the DLLs are malicious.

2. The apparatus of claim 1, wherein the code related to the thread is an execution file or a dynamic link library (DLL).

3. The apparatus of claim 1, wherein the malicious code detection module preliminarily determines whether or not the identified code is malicious by checking at least one of a virtual memory of the process, a portable executable (PE) feature of the identified code, a service attribute of the identified code, and a thread stack.

4. The apparatus of claim 1, wherein the malicious code detection module extracts a list of processes running on the computer system and information, on threads generated by the respective processes to extract the thread information.

5. The apparatus of claim 1, wherein the malicious code detection portable executable (PE) feature of the identified code, and preliminarily determines the code to be malicious when an unknown section is present.

6. The apparatus of claim 1, wherein the malicious code detection module examines a portable executable (PE) feature of the identified code, and preliminarily determines the code to be malicious when a checksum is not correct, or a file size in the PE feature is different from a file size shown in an explorer.

7. The apparatus of claim 1, wherein the malicious code detection module examines an attribute of a service performed by the identified code, and preliminarily determines the code to be malicious when the service has neither a relationship with nor dependency on another service, or automatic start is set for the service.

8. The apparatus of claim 1, wherein when the analysis result of behavior corresponds to one of behavior of disabling an operating system (OS) firewall or vaccine, a virtual environment recognition behavior, and behavior of generating or modifying a file or registry, the forcible malicious code termination module finally determines the code as malicious code.

9. A system including one or more hardware processors for detecting malicious code, comprising:

a malicious code detection apparatus comprising a malicious code detection module loaded on said one or more hardware processors for extracting information on a thread generated by a process running on a computer system to identify code related to the thread, preliminarily determining whether or not the identified code is malicious and extracting code preliminarily determined to be malicious, wherein the malicious code detection module checks whether a string of a file name corresponding to the code related to the thread is present in a virtual memory of the process having generated the thread, and preliminarily determines the code to be malicious when the string is present; and a forcible malicious code termination module loaded on said one or more hardware processors for finally determining the code as malicious based on an analysis result of behavior of the extracted code executed in a virtual environment and forcibly terminating execution of the code; and a virtual environment malicious code behavior analysis apparatus having a tog generation module for executing the code extracted by the malicious code detection module in a virtual environment to generate a behavior log for the code, and a malicious behavior analysis module for analyzing whether the behavior of the code corresponds to one of behavior of disabling an operating system (OS) firewall or vaccine, a virtual environment recognition behavior, and behavior of generating or modifying a file or registry using the log and transferring the analysis result to the forcible malicious code termination module;

wherein when no code related to the thread is identified, the malicious code detection module traces a thread stack to obtain a list of dynamic link libraries (DLLs) being used by the thread, and examines a portable executable (PE) feature of the DLLs to preliminarily determine whether or not the DLLs are malicious.

10. The system according to claim 9, wherein the malicious code detection apparatus operates in a client, and the virtual environment malicious code behavior analysis apparatus operates in a server.

11. The system according to claim 10, wherein the malicious code detection module requests the virtual environment malicious code behavior analysis apparatus to analyze behavior of the extracted code in the virtual environment.

12. A method of detecting malicious code, comprising:

extracting a list of processes running on a computer system and information on a thread subordinate to each process;

identifying code related to the thread, and preliminarily determining whether or not the identified code is malicious by examining at least one of a virtual memory of the process, a portable executable (PE) feature of the code, a relationship between the code and a service process, and a thread stack, wherein the malicious code detection module checks whether a string of a file name corresponding to the code related to the thread is present in a virtual memory of the process having generated the thread, and preliminarily determines the code to be malicious when the string is present;

calculating a degree of malicious threat of the code preliminarily determined to be malicious;

extracting code whose calculated degree of malicious threat is a threshold value or more, and requesting a virtual environment malicious code behavior analysis apparatus to analyze the code;

finally determining the code as malicious code on the basis of an analysis result received from the virtual environment malicious code behavior analysis apparatus; and forcibly terminating execution of the code finally determined to be malicious code;

wherein when no code related to the thread is identified, tracing a thread stack to obtain a list of dynamic link libraries (DLLs) being used by the thread, and examining a portable executable (PE) feature of the DLLs to preliminarily determine whether or not the DLLs are malicious.

13. The method of claim 12, wherein finally determining the code as malicious code includes determining the code as malicious code when the analysis result of the virtual environment malicious code behavior analysis apparatus corresponds to one of behavior if disabling an operating system (OS) firewall or vaccine, a virtual environment recognition behavior, and behavior of generating or modifying a file or registry.

* * * * *